(12) United States Patent
Vitale et al.

(10) Patent No.: US 6,857,498 B2
(45) Date of Patent: Feb. 22, 2005

(54) CONSOLE WITH DRIVER'S INTERFACE

(75) Inventors: Robert Louis Vitale, Macomb Township, MI (US); Christopher E. Borroni-Bird, Oakland Township, MI (US); Mohsen D. Shabana, Ann Arbor, MI (US); Adrian B. Chernoff, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 19 days.

(21) Appl. No.: 10/336,901

(22) Filed: Jan. 6, 2003

(65) Prior Publication Data

US 2004/0016588 A1 Jan. 29, 2004

Related U.S. Application Data

(60) Provisional application No. 60/398,531, filed on Jul. 25, 2002.

(51) Int. Cl.[7] .................................................. B62D 1/02
(52) U.S. Cl. ...................................................... 180/326
(58) Field of Search ................................ 180/322, 326, 180/334, 323, 325

(56) References Cited

U.S. PATENT DOCUMENTS

| | | | |
|---|---|---|---|
| 3,737,003 A | 6/1973 | Beals et al. | |
| 4,478,308 A | 10/1984 | Klaassen | |
| 4,580,647 A | 4/1986 | Peifer et al. | |
| 4,608,550 A | 8/1986 | Umebayashi et al. | |
| 4,646,869 A | 3/1987 | Kerner, Jr. | |
| 4,702,520 A | 10/1987 | Whisler et al. | |
| 4,732,232 A | 3/1988 | Miyagi et al. | |
| 5,409,079 A | 4/1995 | Strong et al. | |
| 5,566,778 A | 10/1996 | Valier et al. | |
| 5,617,929 A | 4/1997 | Richardson et al. | |
| 5,691,695 A | 11/1997 | Lahiff | |
| 5,924,515 A | 7/1999 | Stauffer | |
| 6,164,285 A | 12/2000 | Garberg et al. | |
| 6,650,979 B1 * | 11/2003 | Kreft | 701/41 |
| 6,704,637 B1 * | 3/2004 | Hrazdera et al. | 701/93 |

* cited by examiner

Primary Examiner—Faye M. Fleming
(74) Attorney, Agent, or Firm—Kathryn A. Marra

(57) ABSTRACT

A drive-by-wire control console for a vehicle has a transversely movable control module on a transversely movable, elongated beam which is supported on a longitudinally movable support column which supports the elongated beam. The control module includes steering devices and display screens for vital vehicle information.

18 Claims, 9 Drawing Sheets

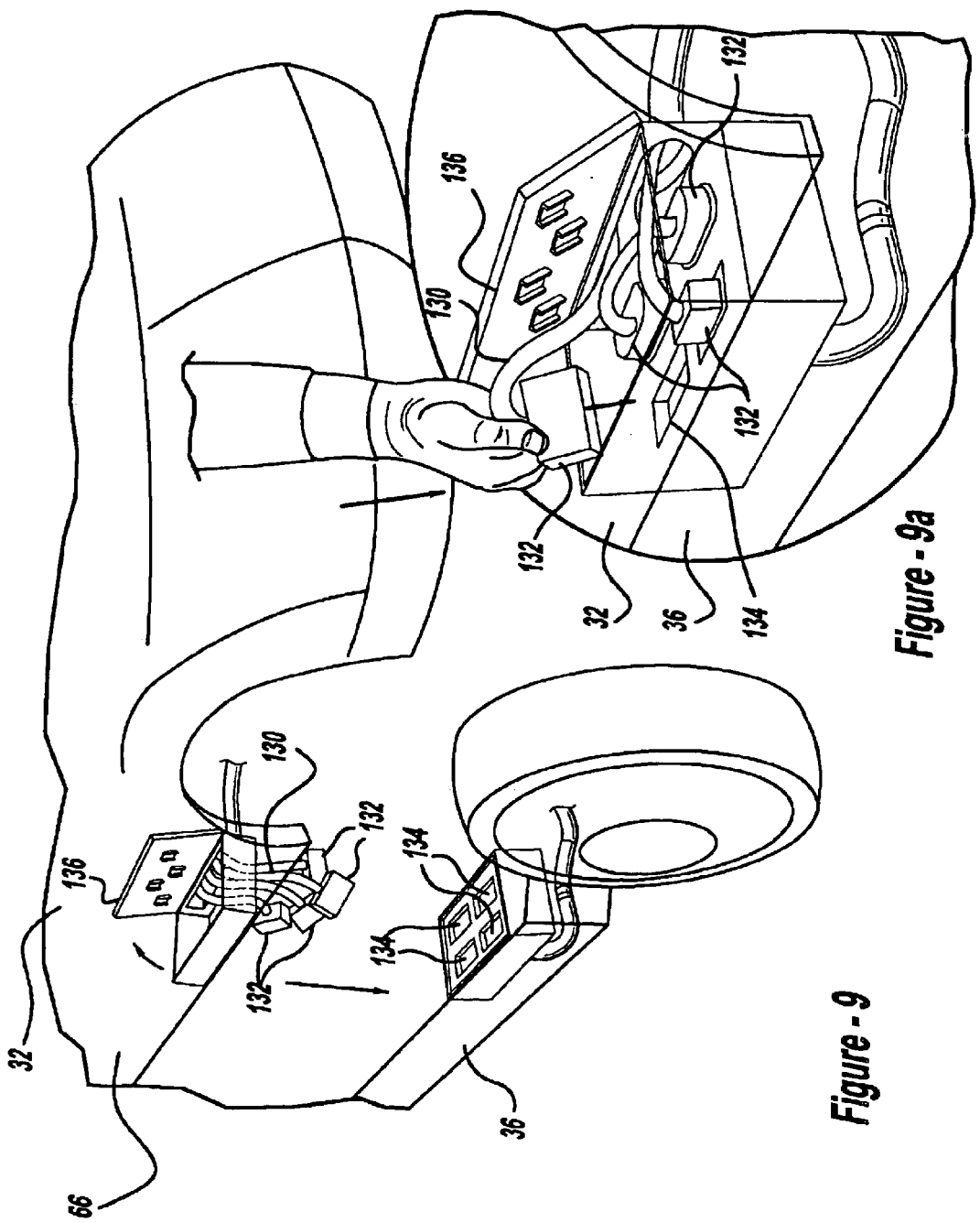

CONSOLE WITH DRIVER'S INTERFACE

CROSS REFERENCE TO RELATED APPLICATION

This application claims the benefit of U.S. Provisional Application No. 60/398,531, filed Jul. 25, 2002 which is hereby incorporated by reference in its entirety.

TECHNICAL FIELD

This invention relates to an improved adjustable control console for use in vehicles, such as passenger cars and trucks.

BACKGROUND OF THE INVENTION

Common practice of vehicle design provides a floorboard to support a seat or seats for the driver and passenger. The floorboard extends into an inclined toe board or dashboard and an upright front wall behind a motor compartment. A motor is installed in the motor compartment. The toe board locates the foot operated controls such as clutch and brake pedals for the driver and is frequently configured with a fixed foot pad to rest the driver's left foot. The front wall includes a dashboard and control panel and a steering wheel in front of the driver for steering the vehicle. A structural frame supports the car body.

SUMMARY OF THE INVENTION

This invention provides an improved control console for a vehicle. The control console is provided with a control module as the driver's interface with the vehicle's operating systems. All of the vehicle's propulsion, comfort, and control systems are contained within a shallow skateboard-like chassis or rolling platform, maximizing the interior space for five occupants and their cargo. There is no engine or motor to see over, preferably no pedals to operate, merely a steering guide that is easily set to a left or right driving position. This is the improved control console for a vehicle with driver's interface. The invention is conceived around the fact that there is no engine compartment. The vehicle is very open from front to end. This highlights the openness in the interior of the vehicle. Since there is no engine in the engine compartment or front wall between the engine and the driver, the driver and passengers have greatly enhanced legroom. Since there is no engine, dashboard or foot pedals in front of the driver, there is just an open cockpit with a floor to ceiling view. The control of the vehicle utilizes a drive-by-wire concept, to provide greater freedom for the driver. Drivers have the option to brake or accelerate with either the right or left hand. The driver accelerates and brakes by hand manipulators on the control module with multiple degrees of freedom such as up to six degrees of freedom. A steering device is on the control module which is translatable leftwardly, rightwardly, forwardly, and backwardly, and is also rotatable. This is different than the prior art vehicles where the steering wheel revolves around a steering column. Drive-by-wire, in accordance with this invention, incorporates an electronic monitor on the control module for vital car functions and may have display screens for rear views of the road and for entertainment. If the vehicle has rear view mirrors, the mirrors are repositioned in response to movement of the control module. The monitor or module shuttles easily from side-to-side on a horizontal bar that can stretch across the full width of the vehicle. The horizontal bar is supported on a column which is extendable and may be rotatable. The column may include an arm rest.

The console interface of this invention thus provides the ultimate in flexibility for the driver. The driver can be on either side of the front seat or, if the armrest is absent, in the middle. The driver can drive from the front or the rear of the vehicle. The control interface would simply be shuttled to the best position depending on where the driver chooses to sit.

The drive-by-wire console of this invention is connectable to all of the technical elements in the chassis by a single docking port between a chassis which may be aluminum and a body which may be fiberglass.

The control console of this invention is also useful in models for mobility interchangeability. This is the process to change the way vehicles are manufactured, i.e. varying self-contained vehicle bodies where floors and seats can be swapped, interchanged, connected and disconnected with a technology frame or rolling platform which includes the technical elements such as power and suspension components.

Accordingly, this invention is a control console for a vehicle which includes a driver's interface with steering by wire. The console includes a transversely movable control module having a display screen. It also includes a transversely movable elongated beam supporting the control module. It also includes a longitudinally movable support column which supports the elongated beam and may be rotatable and which may include an arm rest movable with the longitudinally movable support column. Sufficient actuators provide the module, elongated beam and support column, with multiple degrees of freedom such as six degrees of freedom in module movement. A first actuator may move or shuttle the control module from side-to-side along the elongated beam. A second actuator may move the elongated beam from side-to-side on the support column. A third actuator may move the support column with its arm rest longitudinally in the vehicle toward and away from the driver. Without the attached arm rest, the support column may be rotatable. No matter where the driver sits—in the front or the rear, the module is movable to interface and accommodate the driver.

This invention is also a driver's interface for a vehicle having a plurality of differently located driving positions. The interface is a control module interfaceable with a driver and movable between the driving positions to accommodate the driver's control of the vehicle from different locations, for example, wherein the control module interfaces the driver for steering the vehicle. The steering is preferably by-wire but may be by hydraulic connections or mechanical connections.

The invention is also a driver cockpit for the interchangeable body of a drive-by-wire chassis. The cockpit has a floor having an opening, a pair of seating structures connected to the floor, and a control console between the seating structures and movable longitudinally with respect to the floor and the seating structures. The control console includes a control module movable transversely between positions in driver interface relationship at each seating structure, and has a steer-by-wire component connectable to the chassis by wire through the opening in the floor. The transverse movement of the control module may be facilitated by a transversely movable beam. However, the transverse beam may be fixed between the sides or A-pillars of the vehicle with the control module being movable transversely along the fixed beam.

This invention also contemplates a drive-by-wire control console for a vehicle with a driver's interface. The interface has a universally movable control module having a display screen, a transversely elongated beam supporting the control module, and sufficient actuators to provide the control module with multiple degrees of freedom, such as up to six degrees of freedom.

More particularly, the mobile vehicle of this invention is adapted to be driven by wire. The vehicle includes a seating structure having a plurality of selectable driving positions and a control console movable with respect to a driver in more than one of such selectable positions. The control console includes a support column movable with respect to the seating structure, a beam movable with respect to the support column, and a control module movable with respect to the beam, whereby to interface the control module with the driver. The support column may move longitudinally. The beam may move transversely. The control module may move pivotally with respect to the driver to further accommodate the driver's preferences. The support column, where movable longitudinally, may include an armrest. And, in the combination, the control module has a display portion and a grip portion pivotally movable sufficiently with respect to the display portion to steer the vehicle by wire.

BRIEF DESCRIPTION OF THE DRAWINGS

FIG. 9 shows a fragmentary, exploded perspective schematic view of a rolling platform according to the invention in an attachment scenario with a body pod, the body pod having multiple electrical connectors poised to be electrically engaged with complementary electrical connectors in the rolling platform; and FIG. 9a shows the engagement of the connectors after the body pod and rolling platform are joined.

DESCRIPTION OF THE PREFERRED EMBODIMENTS

Figure 1:
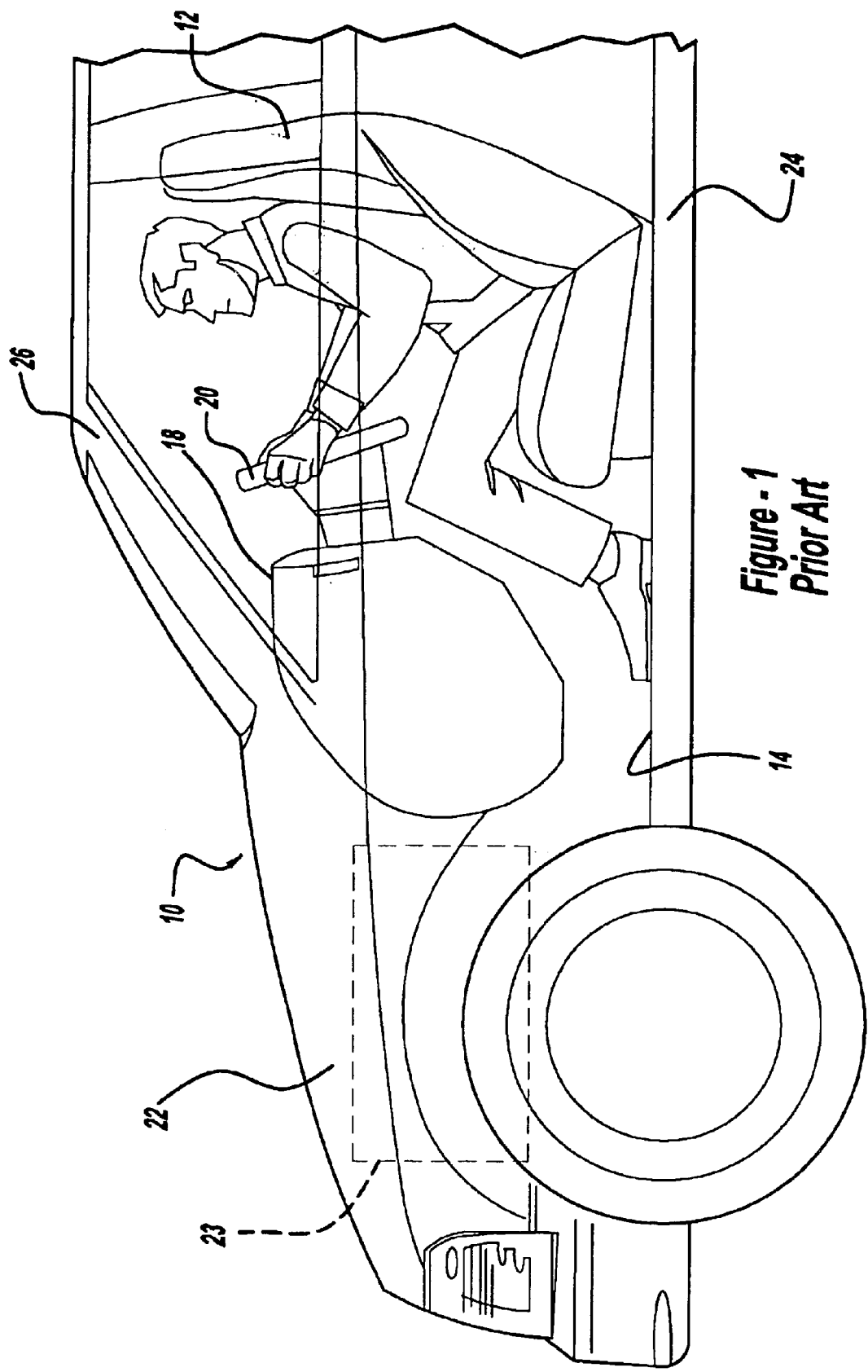
FIG. 1 is a fragmentary side elevational view with parts broken away to show the interior of a prior art vehicle.

FIG. 1 shows the prior art. It shows a vehicle 10 having a seat 12. The seat or seats 12 may be located across the width of the vehicle to accommodate both the driver and a passenger. The vehicle has a control console or dashboard 18 and a steering wheel 20. The prior art vehicle has an elongated hood 22 enclosing a motor compartment 23 and a chassis or structural frame 24 which is permanently fixed in normal use to a predetermined body 26 of the vehicle. In the prior art, the driver is necessarily enclosed in a cockpit behind the motor compartment 23 and the hood 22. From that position the driver steers the vehicle and observes the controls of the dashboard.

Figure 2:
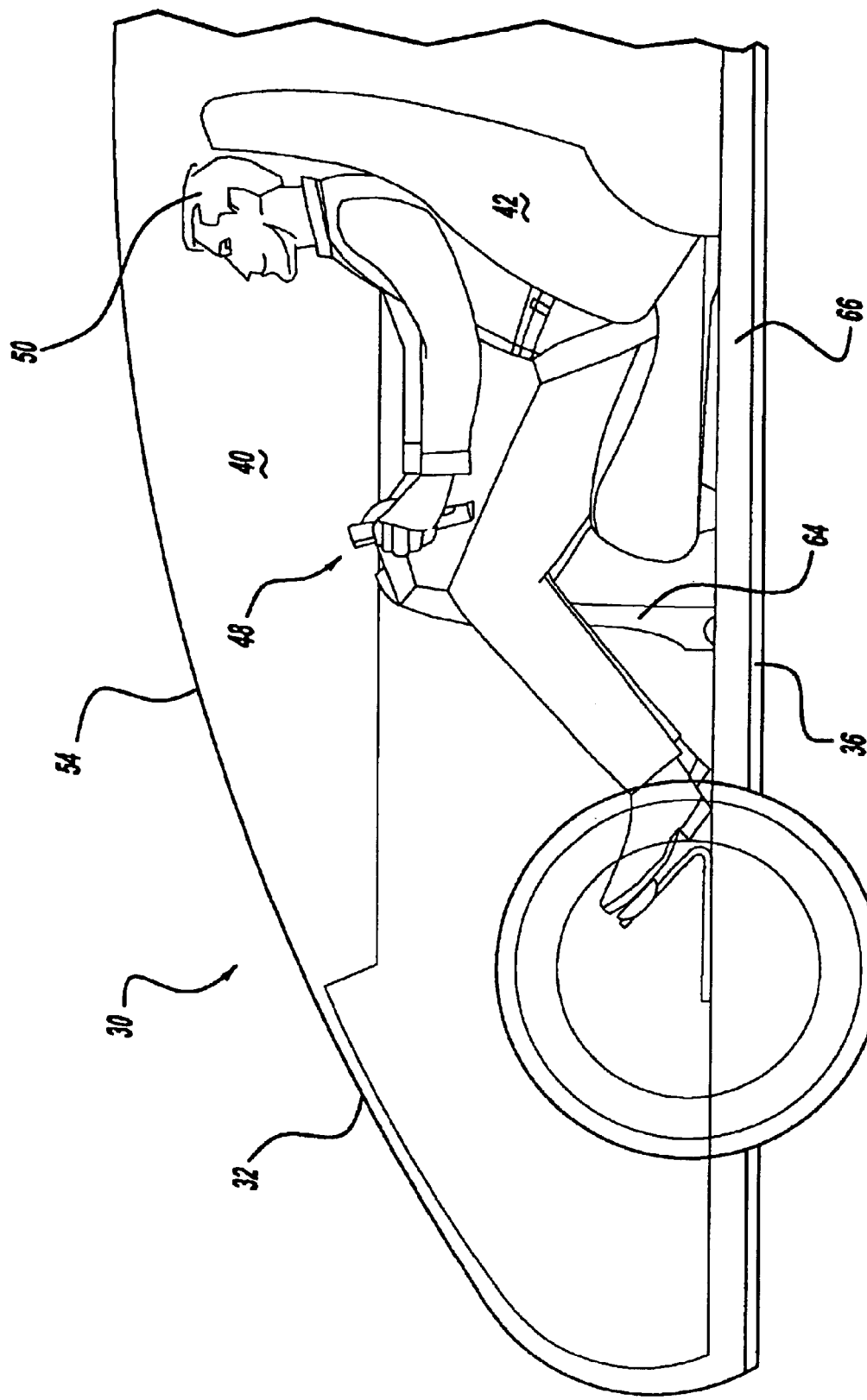
FIG. 2 is a fragmentary schematic left side elevational view of a vehicle having a control console with driver's interface for the vehicle.

FIG. 2 shows the utility of this invention in models of mobility interchangeability. Vehicle 30 is comprised of an interchangeable vehicle body or body pod 32 for use in common with a shallow or thin structural chassis or rolling platform 36. The vehicle body has an interior 40 which forms a cockpit 41 including a driver's seat 42 (near-side—FIG. 2) and a passenger seat (far-side—FIG. 7) normally to the right side of the driver. A full-width bench seat may also be used. A control console 48 is positionable in front of a driver 50 wherever he or she sits and is adjustable for transverse or shuttling movement between the left and right side of the vehicle (FIG. 2 and FIG. 7, respectively) whereby to accommodate driving the vehicle from either side of the vehicle. If the seat 42 were a bench type, the driving of the vehicle could be accomplished from the middle as well but without an intervening armrest. The control console is also adjustable for longitudinal or shuttling movement from front-to-back (FIG. 6) to accommodate the console's proximity to the driver, whether the driver drives from the front or back of the vehicle. The control console may also be controllable to rotate or pivot (FIG. 3) to accommodate a driver's preference.

The vehicle body pod 32 can be configured in different designs or styles for interchangeability with the structural chassis or rolling platform 36. The vehicle bodies are self-contained with a floor 66 and seats 42. The body pods can be swapped, interchanged, connected and disconnected with the technology or structural frame or rolling platform which includes all of the technical elements in the chassis whereby to provide a low center of gravity. The vehicle body pod 32 encases the driver and passengers in large areas of glass 54 for improved visibility. Such vehicle designs for interchangeability are described in the commonly assigned copending application U.S. Ser. No. 10/205,007 filed Jul. 25, 2002, Chernoff, et al. entitled Fuel Cell Vehicle With By-Wire Technology, which is hereby incorporated herein by reference in its entirety.

Figure 6:
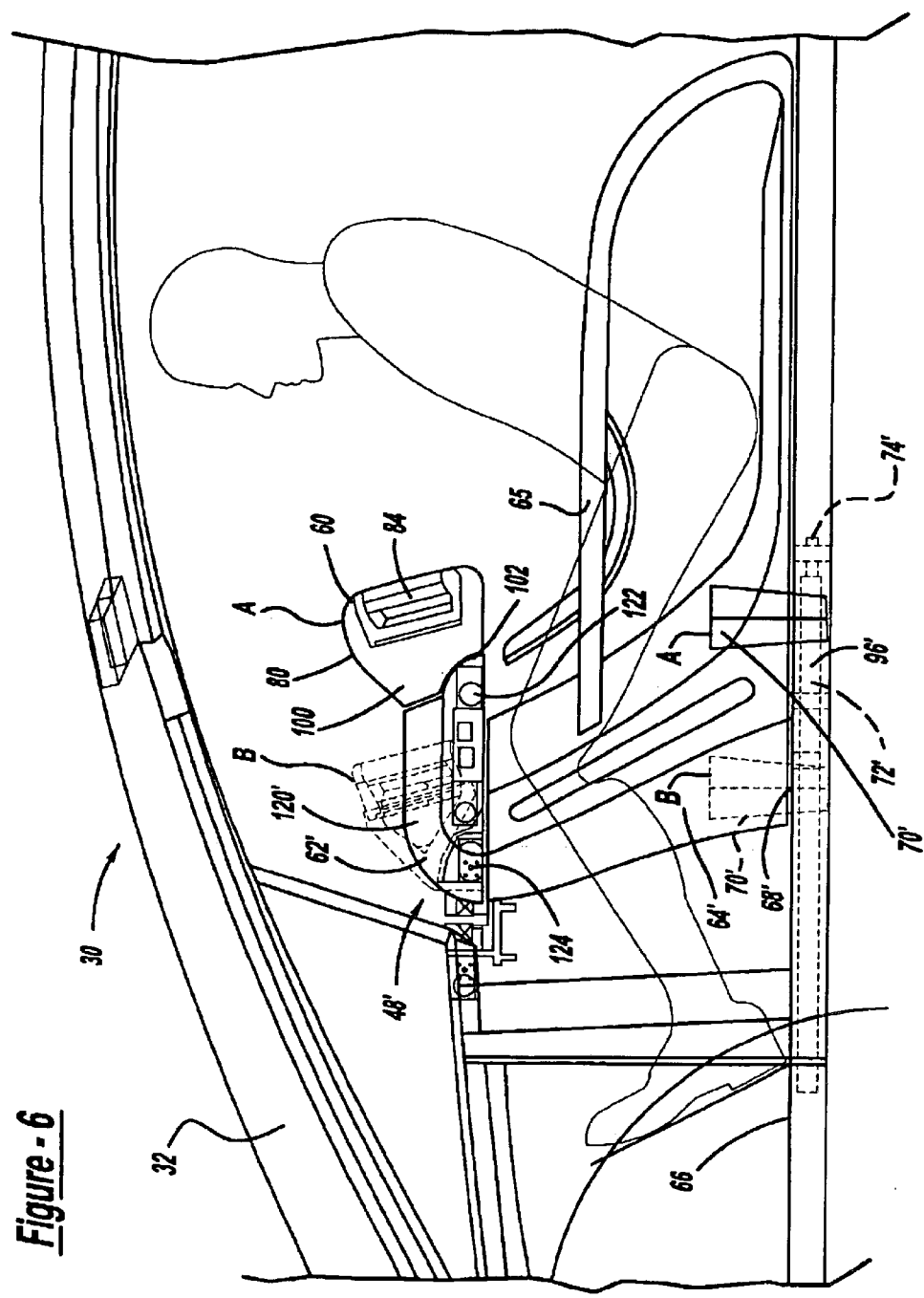
FIG. 6 is a fragmentary side elevational view of a vehicle body, broken away to show the longitudinally movable control console and arm rest with the control module in rearward (solid line) and frontward (dashed line) positions.
Figure 7:
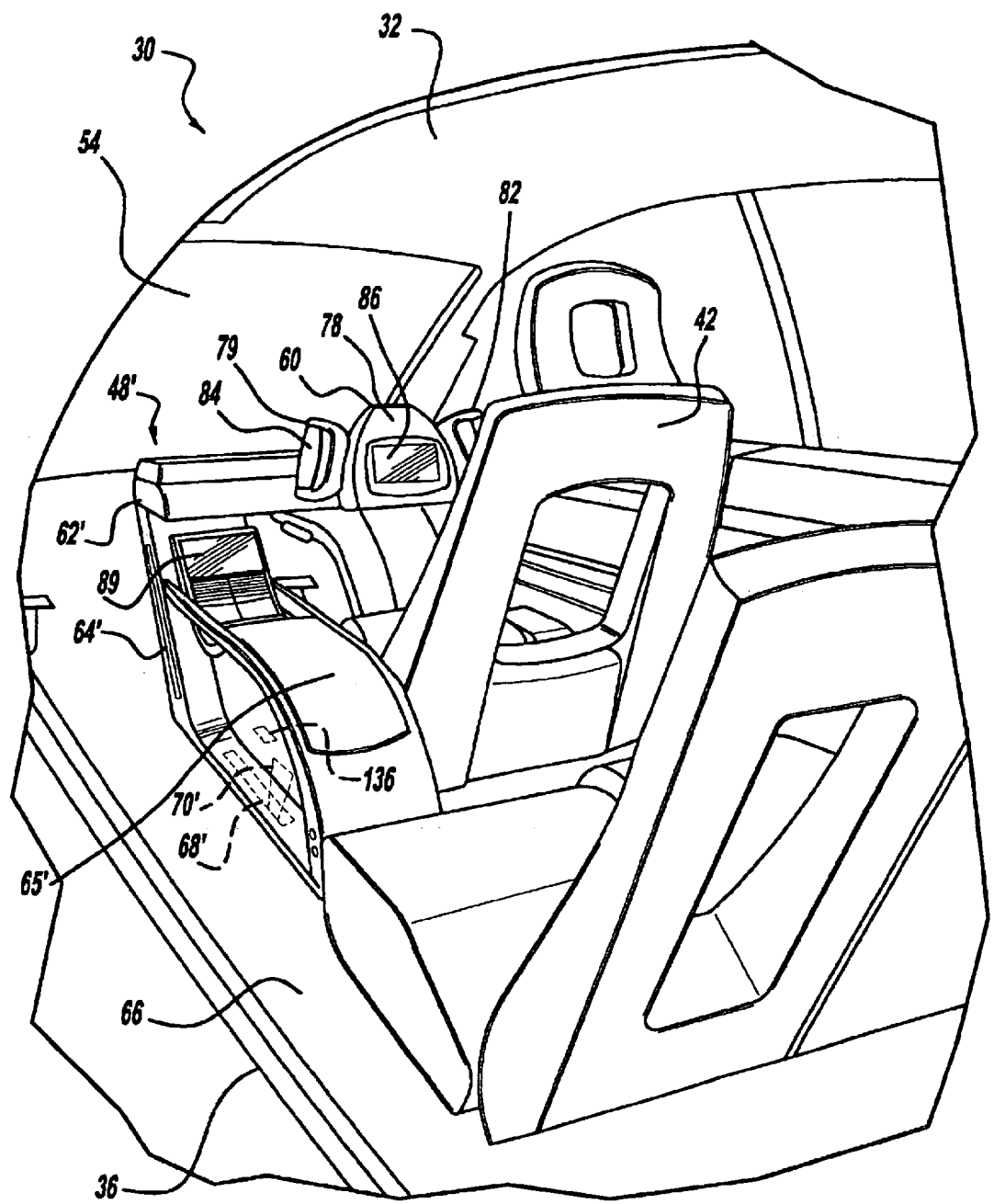
FIG. 7 is a fragmentary rear-to-front view of a vehicle's interior with the control console of this invention.
Figure 8:
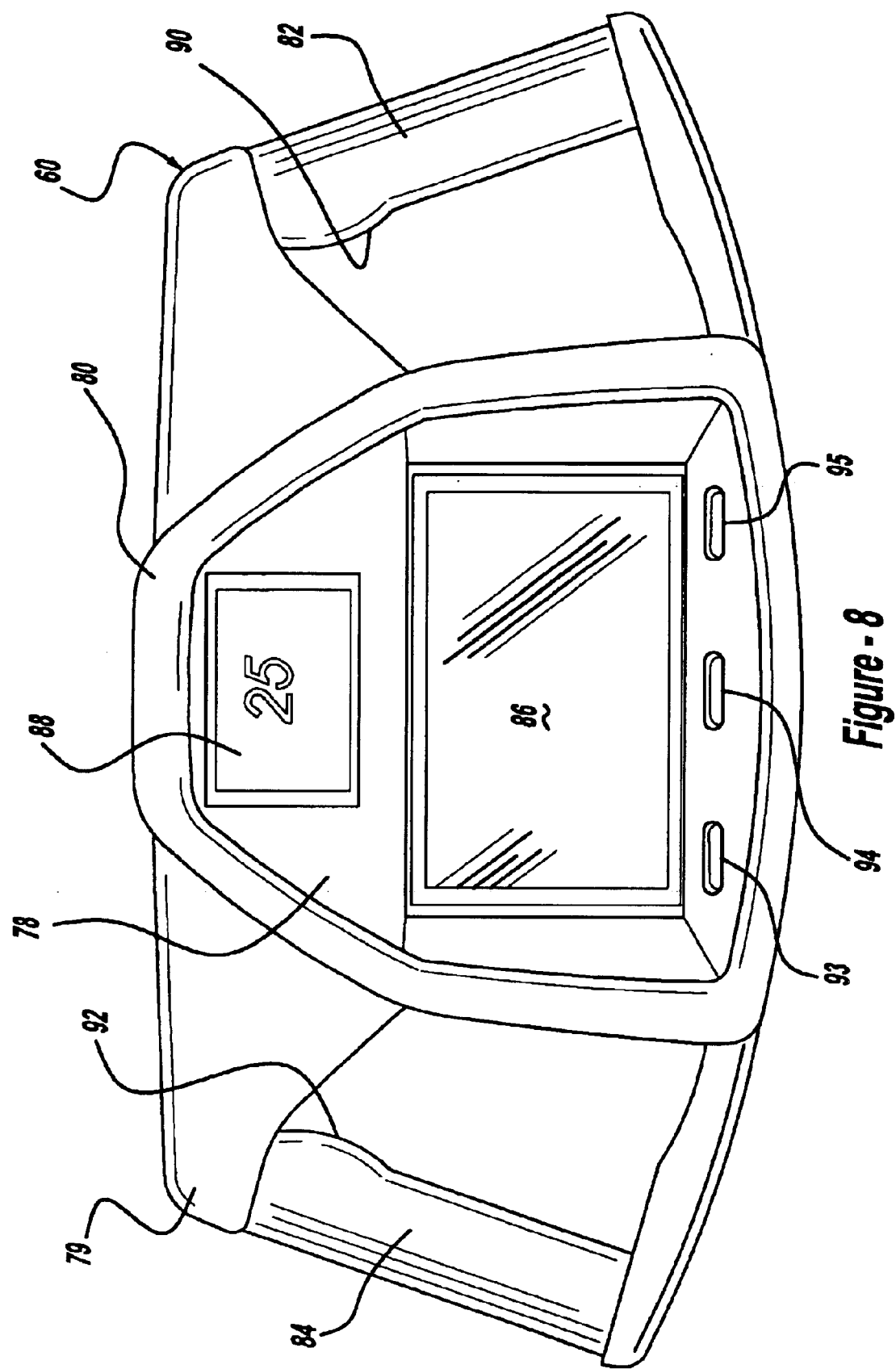
FIG. 8 is a front elevational view of a control module with steer-by-wire for use in this invention.

Turning now to FIGS. 3, 4, 6 and 7 the control console 48, 48' will be described. The primed reference numbers are for the embodiment in FIGS. 6 and 7. The control console includes a control module or driver interface 60, 60' a transversely movable, elongated beam 62, 62', and a longitudinally movable and possibly pivotable or rotatable support column 64, or with an armrest, a front-to-back shuttling support column 64' (FIG. 7). To accommodate the control console 48, 48', the vehicle body 32 has a floor 66. The floor 66 has a slot 68, 68' immediately below the control console 48, 48'. The slot receives a follower 70, 70' respectively at the bottom of the support column 64, 64'. The follower 70 is attached to an arm 72 (FIGS. 3 and 4) of an actuator 74. In the FIG. 6 embodiment, the follower 70' is movably engaged by a worm gear 72' rotated by a motor actuator 74'. Since the support column 64' is connected to the follower 70', the control console 48' moves longitudinally when the worm gear rotates. Each actuator 74, 74' is respectively preferably electrically controlled, but could be hydraulically controlled. When the actuator 74, 74' moves arm 72, or worm gear 72', the support column 64 and 64' (which could include an arm rest 65) is longitudinally moved backward and forward in slot 68, 68' to move the console 48, 48' closer or farther away from the driver. Slots 68, 68' may extend forwardly from the support column 64 (FIG. 3) or rearwardly from the support column 64' (FIG. 6) to accommodate the shuttling movement of the console. The support column 64 (FIG. 3 without the arm rest) may also be pivotable or rotatable. The support column may also be extendable. For this purpose an actuator 76 is adapted with an arm 77 (FIG. 3) which can both pivot or rotate and extend. Separate actuators may also be used. A pair of buttons 73, 75 on the front of the support column 64 may be actuated respectively for left and right movement of the beam and module. To accommodate the extension and maintain the appearance, column 64 may be telescopic.

The control module 60 is described with reference to FIGS. 4, 5, 6, 7 and 8. The control module is comprised of an aluminum housing 80 having a central stationary display portion 78 and a movable handgrip portion 79. Hand grips 82 and 84, which pivot like a steering wheel for steering, are on the hand grip portion. An electronic monitor or display 86, and a speedometer display 88 are on the display portion. The central stationary display portion 78 may be designed to breakaway or contain an airbag. Another display 89 may be carried on arm rest 65 as a source for passenger entertainment, for example. The control module 60 is particularly adaptable for a drive-by-wire procedure. It gives greater freedom to the driver. The driver will be able to brake and accelerate with either the right hand grip 82 or the left hand grip 84. The driver may brake by squeezing the brake actuator portions 90 or 92 located respectively on the hand grips 82, 84 and accelerate by twisting one or either one of the hand grips. It is also within the purview of this invention to utilize a brake pedal on the floorboard. The brake pedal should be concealed below the floorboard when not in use and pop-up when in use. The brake pedal would be as adjustable as module 60 to accommodate the driver's position. Significantly with this invention, steering the vehicle is accomplished by wire through the control module or driver interface 60.

Tending to move or pivot the hand grips 82, 84 in a desired steering direction motivates the module 60 for steering the vehicle by wire. More particularly, the hand grips 82, 84 are moved sufficiently in a steering wheel direction with respect to the module housing 80 so that an electrical signal is sent-by-wire to responders in the chassis 36 for the vehicle wheels that steer. This further distinguishes prior art vehicles where the steering wheel revolves around a steering column. The electronic monitor or display 86 is operable to display the status of vital car functions and includes controls for screen selection 93, power supply 94, and interior light 95. The control module 60 may include a display 88 for functions like speed, fuel, etc. Display 86 may also be utilized with a camera for rear view instead of a mirror. Display 89 on the arm rest may be used as a screen for entertainment or also as a read-out for vital car functions.

With reference to FIGS. 9 and 9a, bundles of wires or pigtails 130 originating in the control module 60 are assembled with electrical connectors (male) 132 for steering-by-wire and driving (accelerating/decelerating and braking)-by-wire. Other bundles of wire 130 transfer control intelligence for other vehicle body devices in the rolling platform such as air conditioning, fuel supply and tire inflation. Slack is provided in each bundle to accommodate the relative movements of module, beam, and support column. A docking port or electrical connector (female) 134 provides the complementary electrical connection for the wire bundle connectors 132 between the chassis or rolling platform 36 and the control module 60 on the body pod 32. A single trap door 136, for example, in floor 66 beneath the support column 64' in FIG. 7 may provide the means for the wire bundles from the control module 60 to electrically connect or communicate intelligently with the devices to be controlled in the chassis or rolling platform 36 therebelow. The chassis 36 is also mechanically connected to the vehicle body 32 and may be disconnected or detached if a different body style is desired to be interchanged with the chassis.

Figure 5:
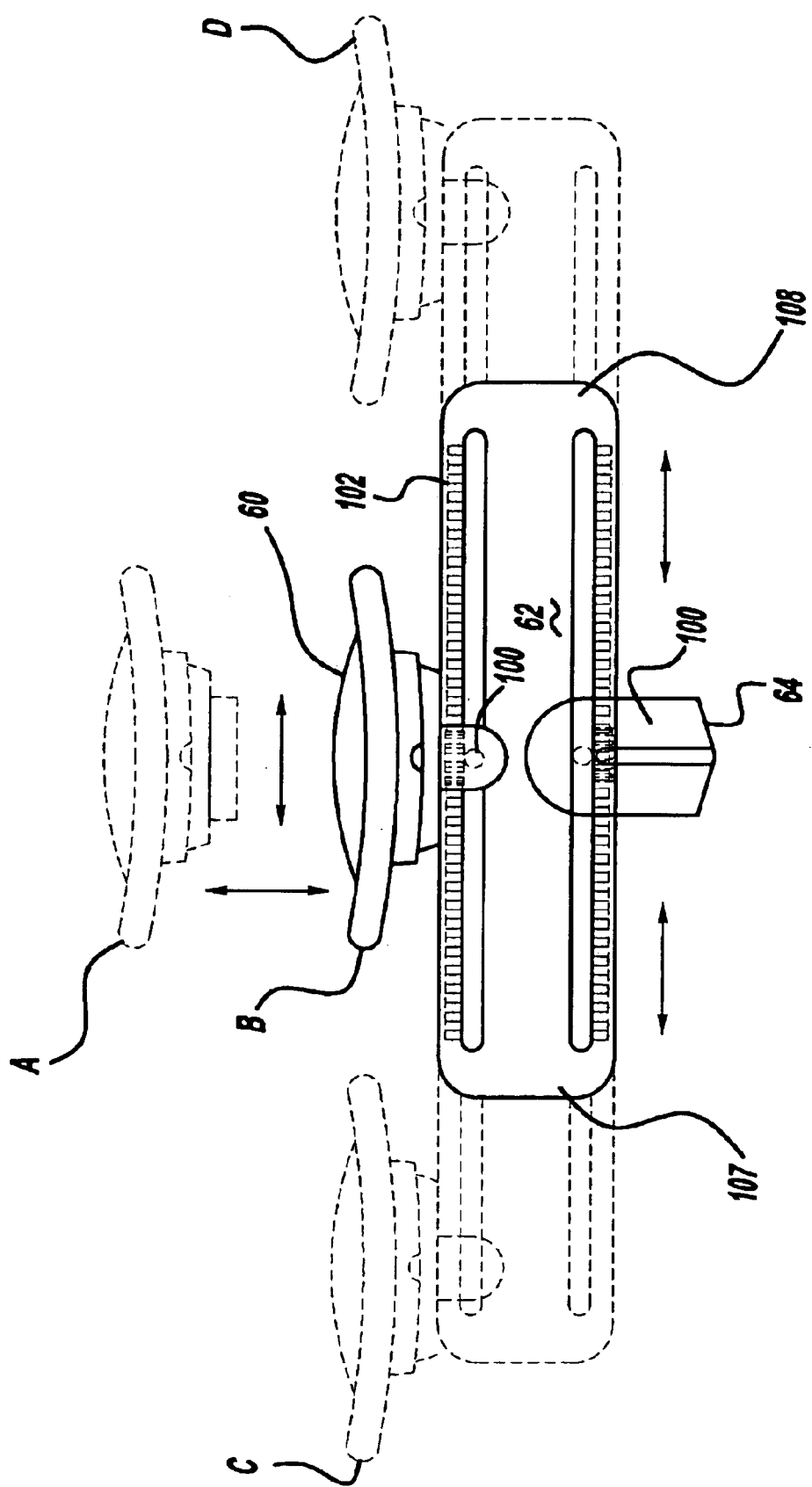
FIG. 5 is a top elevational view of a transversely movable elongated beam for use in the control console of this invention with the control module in the center driver's position (solid line) and in right, left, and rearward driver's positions (schematically in dashed line)

Drivers come in all sizes and in the past have wanted the steering wheel closer or farther from themselves. In accordance with this invention and to provide flexibility for a driver's seat positioning and size, the drive-by-wire control module 60 and the support column 64, 64' slide longitudinally along track or guides 68, 68' to accommodate the preferences of various drivers. FIGS. 5 and 6 show the control module 60 in a closer-to-driver rearward position A and a farther-from-driver forward position B.

In further accordance with this invention and with references to FIGS. 4, 5, 6 and 7, drivers may also prefer to drive from the right, left or center of the vehicle. Thus, transverse movement of control module 60 is accomplished as follows. The module housing 80 (FIG. 4) includes a housing projection 100 which overlays an elongated front portion 102 of the transversely movable, elongated beam 62. The beam carries a rack 104 (phantom line) which cooperates with a motor-driven pinion 106 (phantom line) in the housing projection 100. As the pinion 106 rotates, the control module 60 moves from one end 107 of the beam 62 to the other end 108 of the beam. With regard to beam 62' (FIG. 6) a motor-driven first worm gear 122 extends across the front of the beam and is rotatable in cooperation with a follower (not shown) to move the module 60 side-to-side with respect to the beam.

Figure 3:
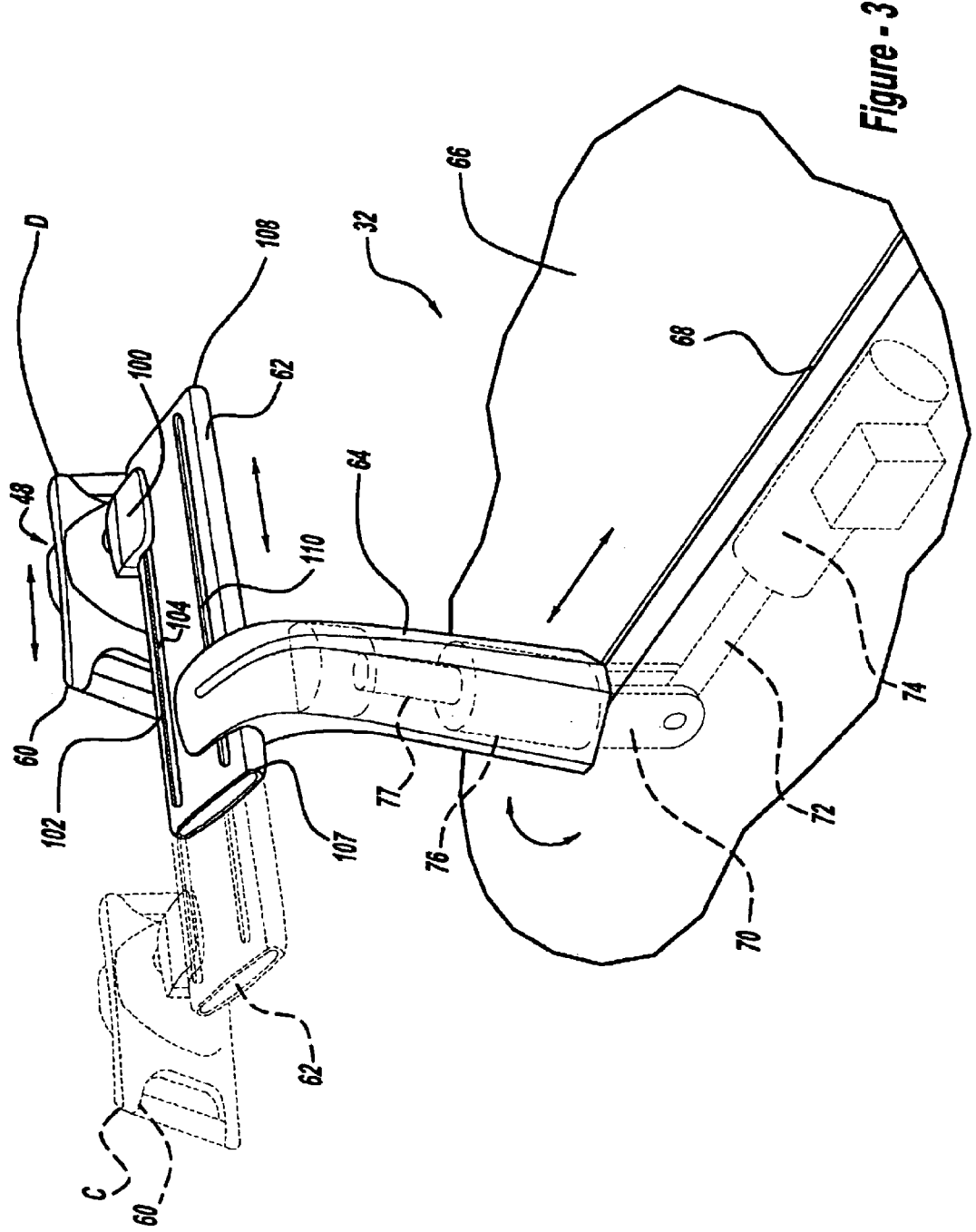
FIG. 3 is a fragmentary rear-to-front perspective view of the control console of this invention installed on the floorboard of a vehicle and showing the beam and control module in a left-side driver's position (solid line) or a right-side driver's position (dashed line)
Figure 4:
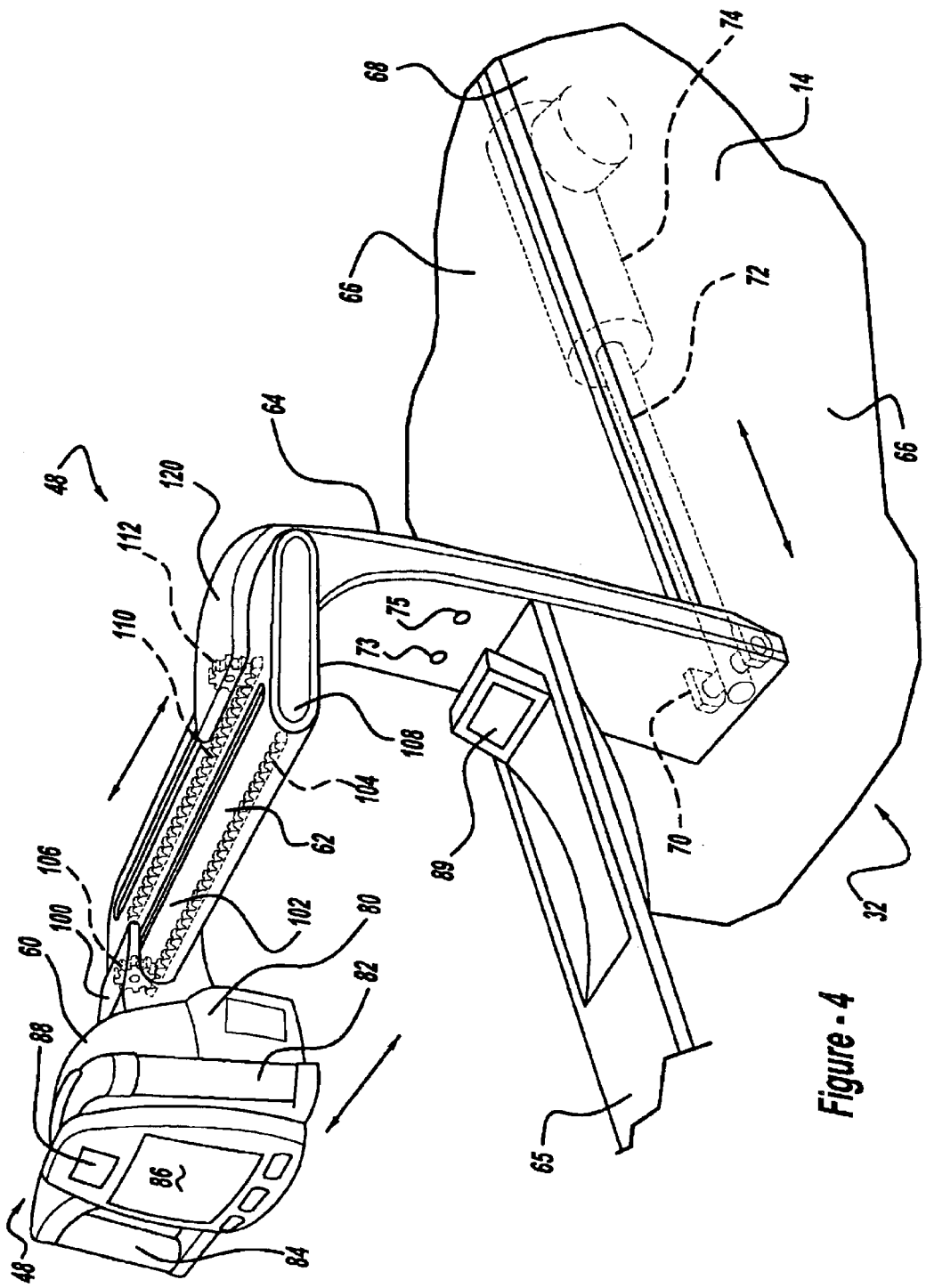
FIG. 4 is a front-to-rear perspective view of the control console of this invention installed on the floorboard of a vehicle and showing the beam and control module in the left-side driver's position.

For additional sidewise flexibility of module 60, the transversely moveable, elongated beam 62 includes a second rack 110 (FIG. 4) and the support column 64 has a second pinion 112 in a projection or overhang 120 of the support column. The second pinion is motor-driven and operates to shift or transversely move the beam 62 side-to-side. With regard to beam 62' a second motor-driven worm gear 124 extends across the back of the beam in a projection or overhang 120' and is rotatable in cooperation with a follower (not shown) to move beam 62' side-to-side with respect to the support column 64'. The motors which drive pinions 106 and 112 and worm gears 122 and 124 work together when the actuator buttons 73 or 75 are depressed. Thus the side-to-side motion of control module 60 and the side-to-side motion of the elongated beams 62, 62' cooperate to position the module selectively from one side of the vehicle to the other side of the vehicle. When the beams are farthest right, the module is farthest right and when the beams are farthest left, module 60 is farthest left. This accommodates the drive-by-wire capability of the control module to steer the vehicle from any desired driver position because the control module with its steering grips 82, 84 and its electronic monitor 86 shuttles easily from side-to-side on a horizontal beam which also shuttles sidewise to reach across the full width of the vehicle. FIG. 3 shows the control module 60 in rightward and leftward positions C and D in accordance with the transverse movements of the beam 62 or 62' and/or the control module 60. FIGS. 5 and 6 show the control module 60 in forward and rearward positions A and B in accordance with the longitudinal movements of the control console 48, 48'.

Universal flexibility may be achieved in each of the embodiments of the invention by modifying the control module 60 to include sufficient actuators in the control module housing 80 so as to permit the housing to pivot robotically with multiple degrees of freedom such as up to six degrees of freedom with respect to the housing projection 100, i.e. universally. In this embodiment, the driver may further personalize his/her interface with the vehicle control. Thus the console with the driver's interfacing module of this invention provides the ultimate in flexibility for the vehicle's utility.

There are other variations within the purview of this invention. Beams like 62 or 62' could be in a fixed position extending across the vehicle from one side of the vehicle's interior to the other side or between the A pillars. By omitting the support column 64, 64' the driver or a passenger could sit in the middle. The desired flexibility for the driver's interface could be accomplished with actuators (not shown) within the control module housing 80. With sufficient actuators the module housing with its controls and display monitors may pivot universally (upwardly, downwardly, leftwardly, and rightwardly), extend and retract longitudinally in the vehicle, and translate transversely across the vehicle along the fixed beam 62, much like a robotic arm.

While the best modes for carrying out the invention have been described in detail, those familiar with the art to which this invention relates will recognize various alternative designs and embodiments for practicing the scope of the invention within the scope of the appended claims.

What is claimed is:

1. A driver's interface for a vehicle having a plurality of differently located driving positions comprising:

a control module interfaceable with a driver and transversely movable between the driving positions to accommodate the driver's control of the vehicle from different locations;

wherein the control module interfaces the driver for steering the vehicle.

2. The driver's interface of claim 1, wherein the control module interfaces the driver for accelerating or decelerating the vehicle.

3. The driver's interface of claim 1, including a display device for providing the driver with control information.

4. The driver's interface of claim 1, wherein the control module is on a control console and includes sufficient actuators to provide the control module with multiple degrees of freedom.

5. The driver's interface of claim 1, including a transversely movable be for supporting the control module.

6. The driver's interface of claim 5, wherein the control module is transversely movable with respect to the beam.

7. The driver's interface of claim 1, wherein the driver's control of the vehicle is by wire.

8. A driver's interface for a vehicle having a plurality of differently located driving positions comprising:

a control module interface with a driver and movable between the driving positions to accommodate the driver's control of the vehicle from different locations;

wherein the control module interfaces the driver for steering the vehicle; and wherein the interface of the control module permits the driver to steer-by-wire.

9. A drive-by-wire control console for a vehicle with a driver's interface comprising:

a universally movable control module;

a transversely elongated beam supporting the control module; and sufficient actuators to provide the control module with multiple degrees of freedom.

10. The drive-by-wire control console of claim 9, wherein the control module has a display screen.

11. A mobile vehicle adapted to be driven by wire and comprising:

seating structure having a plurality of selectable driving positions; and a control console movable with respect to a driver in more than one of such selectable positions;

the control console including a support column movable with respect to the seating structure, a beam movable with respect to the support column, and a control module movable with respect to the beam, whereby to interface the control module with the driver.

12. The mobile vehicle of claim 11, wherein the support column is movable longitudinally.

13. The mobile vehicle of claim 11, wherein the beam is movable transversely.

14. The mobile vehicle of claim 11, wherein the control module is further movable pivotally with respect to the driver.

15. The mobile vehicle of claim 11, wherein the support column further includes an armrest between a pair of such positions.

16. The mobile vehicle of claim 11, wherein the control module is comprised of a display portion and a grip portion pivotally movable sufficiently with respect to the display portion to steer the vehicle by wire.

17. A driver cockpit for the interchangeable body of a drive-by-wire chassis comprising:

a floor having an opening;

a pair of sealing structures connected to the floor; and a control console between the seating structures and movable longitudinally with respect to the floor and the seating structures;

the control console including a control module movable transversely between positions in driver interface relationship at each seating structure; and the control module having a steer-by-wire component connectable to the chassis by wire through the opening in the floor.

18. The driver cockpit of claim 17, wherein the transverse movement of the control module is facilitated by a transversely movable beam.

* * * * *